(12) United States Patent
Kang

(10) Patent No.: US 10,020,496 B2
(45) Date of Patent: Jul. 10, 2018

(54) ANODE MATERIAL FOR SECONDARY BATTERY AND METHOD OF PREPARING THE SAME

(76) Inventor: Yoon-Kyu Kang, Incheon-si (KR)

(*) Notice: Subject to any disclaimer, the term of this patent is extended or adjusted under 35 U.S.C. 154(b) by 337 days.

(21) Appl. No.: 14/397,343

(22) PCT Filed: Jul. 9, 2012

(86) PCT No.: PCT/KR2012/005426
§ 371 (c)(1),
(2), (4) Date: Oct. 27, 2014

(87) PCT Pub. No.: WO2013/162123
PCT Pub. Date: Oct. 31, 2013

(65) Prior Publication Data
US 2015/0325847 A1  Nov. 12, 2015

(30) Foreign Application Priority Data
Apr. 26, 2012 (KR) .................. 10-2012-0043811

(51) Int. Cl.
*H01M 4/36* (2006.01)
*H01M 4/133* (2010.01)
(Continued)

(52) U.S. Cl.
CPC ....... *H01M 4/366* (2013.01); *C04B 35/62807* (2013.01); *C04B 35/62839* (2013.01);
(Continued)

(58) Field of Classification Search
CPC ...... H01M 4/131; H01M 4/133; H01M 4/364; H01M 4/366; H01M 4/483; H01M 4/484; C04B 35/62804
See application file for complete search history.

(56) References Cited

U.S. PATENT DOCUMENTS 5,970,384 A * 10/1999 Yamazaki ............... C23C 14/58
  257/E21.192
6,019,802 A *  2/2000 Ishizuka ................. H01M 4/139
  29/623.5
(Continued)

FOREIGN PATENT DOCUMENTS

CN  1667855 A   9/2005
CN  101232093 A  7/2008
(Continued)

OTHER PUBLICATIONS

Doh, Chil-Hoon, et al., "Improved anode performance of thermally treated SiO/C composite with an organic solution mixture", Electrochemistry Communications 10 (2008), p. 233-237.
(Continued)

*Primary Examiner* — Kenneth J Douyette
(74) *Attorney, Agent, or Firm* — The Webb Law Firm

(57) ABSTRACT

Provided is an anode material for a secondary battery, and more particularly, to an anode material for a secondary battery using a silicon oxide (SiOx), and a method of preparing the same. There is provided an anode material for a secondary battery, formed by preparing an SiOx and a carbon material, mixing the SiOx and the carbon material, forming a SiOx-carbon (SiOx-C) composite, and performing a heat treatment.

6 Claims, 3 Drawing Sheets

(51) Int. Cl.
*H01M 4/131* (2010.01)
*C04B 35/628* (2006.01)
*H01M 4/587* (2010.01)
*H01M 4/485* (2010.01)
*H01M 4/583* (2010.01)
*H01M 4/48* (2010.01)
*H01M 4/02* (2006.01)
*H01M 4/134* (2010.01)
*H01M 10/052* (2010.01)

(52) U.S. Cl.
CPC ........... *H01M 4/131* (2013.01); *H01M 4/133* (2013.01); *H01M 4/483* (2013.01); *H01M 4/485* (2013.01); *H01M 4/583* (2013.01); *H01M 4/587* (2013.01); *C04B 2235/02* (2013.01); *C04B 2235/3418* (2013.01); *C04B 2235/425* (2013.01); *C04B 2235/5248* (2013.01); *C04B 2235/5264* (2013.01); *C04B 2235/5288* (2013.01); *C04B 2235/5454* (2013.01); *C04B 2235/6562* (2013.01); *C04B 2235/6565* (2013.01); *H01M 4/134* (2013.01); *H01M 10/052* (2013.01); *H01M 2004/027* (2013.01); *H01M 2220/20* (2013.01)

(56) References Cited

U.S. PATENT DOCUMENTS

2003/0118905 A1* 6/2003 Fukuoka ............... C09C 1/3045
429/218.1
2005/0233213 A1 10/2005 Lee et al.
2008/0026590 A1 1/2008 Zhuang et al.
2008/0166634 A1 7/2008 Kim et al.
2008/0193831 A1 8/2008 Mah et al.
2009/0029256 A1* 1/2009 Mah .......................... H01B 1/24
429/231.8
2011/0291055 A1* 12/2011 Kojima ................... C01B 33/32
252/506

FOREIGN PATENT DOCUMENTS

| CN | 101510607 A | 8/2009 |
|---|---|---|
| JP | 2008-34840 A | 2/2008 |
| KR | 10-0761000 | 9/2007 |
| KR | 10-2011-0046076 | 5/2011 |
| KR | 10-2011-0053027 | 5/2011 |
| KR | 10-1036288 | 5/2011 |
| KR | 10-1113008 | 1/2012 |
| WO | 20121036354 A1 | 3/2012 |

OTHER PUBLICATIONS

Wang Jing, et al.,"Synthesis and electrochemical properties of SiOx/C composite anode for lithium-ion batteries", The 15th International Meeting on Lithium Batteries, 2010 The Electrochemical Society, Abstract #74.

* cited by examiner (a)

(b)

(a)

| Category | Single Charge Capacity | Single Discharge Capacity | Single Efficiency |
|---|---|---|---|
| No. 1 | 1325.82mAh/g | 635.30mAh/g | 47.92% |

(b)

(c)

ANODE MATERIAL FOR SECONDARY BATTERY AND METHOD OF PREPARING THE SAME

CROSS-REFERENCE TO RELATED APPLICATIONS

This application is the United States national phase of International Application No. PCT/KR2012/005426 filed Jul. 9, 2012, and claims priority to Korean Patent Application No. 10-2012-0043811 filed Apr. 26, 2012, the disclosures of which are hereby incorporated in their entirety by reference.

TECHNICAL FIELD

The present disclosure relates to an anode material for a secondary battery, and more particularly, to an anode material for a secondary battery using a silicon oxide and a method of preparing the same.

BACKGROUND ART

Securing new energy sources is emerging as an international issue, due to the recent problems of depletion of fossil fuels and global warming. Accordingly, development of renewable energy sources and energy storage to enhance the efficient use of energy are becoming increasingly important.

Particularly, in the automobile industry, development of electric vehicles is urgently required, due to the coming depletion of fossil fuels. However, in the case of using conventional lithium secondary batteries, driving a vehicle over relatively long distances of more than 200 km on a single battery charge may be problematic. Conventional lithium secondary batteries are also not appropriate for long-term energy storage systems storing power generated by renewable energy sources.

In order to resolve this problem, development of new high-capacity, high-output materials and of new technological designs is necessary. In particular, the development of novel anode materials has been receiving a great deal of attention, due to limitations on the development of cathode materials.

As an anode material for a secondary battery, graphite-based materials may be used. However, using such graphite-based materials may result in relatively low capacity (theoretical capacity: approximately 372 mAh/g, approximately 830 mAh/ml; practical capacity: approximately 330 mAh/g), and therefore, development of an anode material having a capacity of 500 mAh/g or above is becoming increasingly important, in order to replace graphite-based materials in preparing high-capacity lithium secondary batteries.

Silicon (Si)-based materials are emerging as new anode materials that can replace graphite-based materials. The biggest advantage of secondary batteries using such Si-based materials is a large capacity, around 4 times the unit volume and 10 times the unit mass of secondary batteries using graphite-based materials. Also, in case of forming such batteries with $LiCoO_2$, $LiMn_2O_4$, and the like, the voltage of the batteries is approximately 3.4V, merely 0.3V lower than 3.7V of the conventional batteries. Thus, another advantage of such secondary batteries is an immediate possible commercialization if the anode materials are made stable for charging and discharging. However, a problem with the Si-based materials as anode materials may also exist regarding weight and volume after a reaction with lithium, since the Si-based materials show a great change in volumes after reaction with lithium, whereas the change in the volumes of graphite-based materials is small after reaction with lithium.

As a method of avoiding the volumetric expansion of Si materials after reaction with lithium (Li), Sanyo has developed a method using Si-based materials having a columnar structure as electrodes, the volume of which can be expanded by controlling the form thereof. The method is known to include forming the electrodes by applying Si columnar structure onto a current collector substrate through physical deposition. The Si-based materials in the columnar structure in this method reportedly have more than 3000 mAh/g of capacity and adequate initial efficiency of 96%.

However, the volumetric expansion by the reaction with Li changes the length (or thickness) of the columnar structures as well as the width of the columnar structures from 6 μm to 17 μm, and then reversibly changes to 11 μm. Such problems in the efficiency of electrode processes forming the columnar structures exist, as well as in Li concentration gradient in portions of the columnar structure and in forming second products with the current collector formed of copper (Cu). Meanwhile, research is on-going with regard to methods of controlling the structural forms such as micro-porous, nanofiber, tube, rod, and the like. However, the applicability of such methods is uncertain.

Meanwhile, in case of using a Titanium (Ti)-based material such as lithium titanium oxide ($Li_4Ti_5O_{12}$: LTO), LTO exhibits only minute changes in volume (0.1-0.2%) during a reaction with Li. LTO, having zero-strain in crystal lattice, performs excellently in output, extended lifespan, and stability. However, LTO also includes weaknesses in that it has higher electric potential and lower capacity than those of graphite.

Meanwhile, besides the Si and Ti materials, interest in silicon oxide (SiOx) materials is increasing. Silicon oxides have high capacity, of approximately 1000 mAh/g, but exhibit weakness in terms of volumetric expansion and in the fact that relatively expensive SiOx are used in large amounts when forming compound materials.

Therefore, in order to be applicable for use in automobiles that require high capacity, such as hybrid vehicles (HV), plug-in hybrid electric vehicles (PHEV), and the like, development of relatively low-priced SiOx-based anode materials having low volumetric expansion and stable electric potential for secondary batteries is urgent.

Meanwhile, there are related art documents 1 through 3. Patent document 1 relates to a method of forming a high-capacity anode material for a secondary battery by forming porous carbon, but patent document 1 does not disclose a technology of using SiOx as an anode material. Patent document 2 relates to a technology of coating silicon-based materials and carbon materials with an organic solvent, but patent document 2 includes a wet method having a low applicability and an inconvenient process. Patent document 3 relates to a technology with which a silicon-carbon composite is prepared using gas plasma. According to the technology, the silicon-carbon composite is prepared by activating a silicon precursor by the gas plasma on the surfaces of graphite- or coke-based carbon particles using a spray method. This technology utilizes relatively expensive plasma, thus having a low applicability.

(Patent Document 1) Korean Patent Laid-open Publication No. 2011-0053027
(Patent Document 2) Korean Patent Laid-open Publication No. 2011-0046076
(Patent Document 3) Korean Patent No. 0761000

SUMMARY OF THE INVENTION

An aspect of the present disclosure provides an anode material for a secondary battery using relatively inexpensive silicon oxide that may have high output capacity and suppress volumetric expansion even when reacting with lithium, and a method of preparing the same.

According to an aspect of the present disclosure, there is provided a method of preparing an anode material for a secondary battery including: preparing a silicon oxide (SiOx) and a carbon material; forming a SiOx-carbon (SiOx-C) composite by mixing the SiOx and the carbon material at a weight ratio of 15:1-7:3 and performing a solid state reaction; and performing a heat treatment on the SiOx-C composite to 800-1000° C. at a temperature increase rate of 1-10° C./minute for 30 minutes to 3 hours, and performing cooling at a cooling rate of 1-10° C./minute.

According to another aspect of the present disclosure, there is provided an anode material for a secondary battery formed of a SiOx-carbon (SiOx-C) composite in which surfaces of silicon oxide (SiOx) particles are coated with a carbon material.

According to exemplary embodiments of the present disclosure, there is provided a high-capacity anode material for a secondary battery that may be used not only in IT materials but in electric automobiles. In particular, by providing an anode material that may suppress volumetric expansion when reacting with Li, and thus preparing a secondary battery able to be used stably, applicability may be high.

Best Mode

Figure 1:
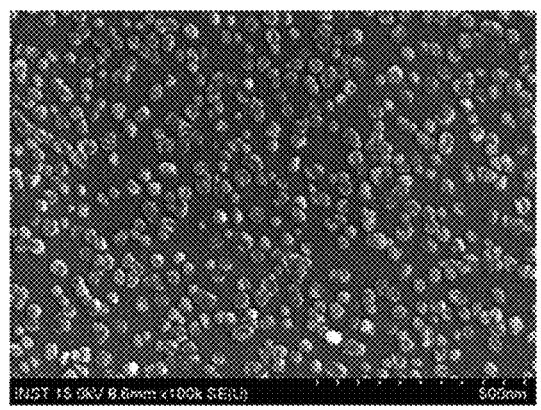
FIGS. 1A and 1B are electron microscopic images of particles observed before and after coating pitch-based carbon fibers, respectively, in an exemplary embodiment of the present disclosure.
Figure 1:
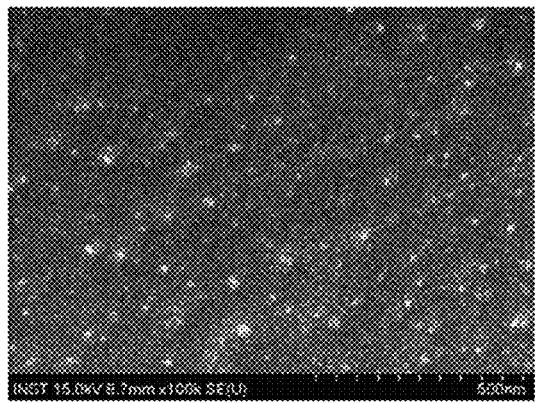

Hereinafter, embodiments of the present disclosure will be described in detail.

A method of preparing an anode material for a secondary battery in the exemplary embodiment of the present disclosure is described in detail.

A silicon oxide (SiOx) and a carbon material may be prepared.

The SiOx used in the exemplary embodiment of the present disclosure is not limited to any specific type or preparation method thereof.

A silicon oxide prepared by mixing silicon tetrachloride ($SiCl_4$) and ethylene glycol at a weight ratio of 10:90-70:30, performing stirring thereof for 2-72 hours at temperature of 50-300° C., and finally heat-treating the resultant gel at a temperature of 500-1000° C. may be used.

The types of carbon materials are not particularly limited, and examples thereof may include pitch-based carbon fibers, carbon nanotubes (CNT), carbon nanofibers (CNF), graphene, graphite, and the like.

A SiOx-carbon (SiOx-C) composite may be formed by mixing the SiOx and the carbon material and by undertaking a solid state reaction thereof.

The weight ratio for the mixing of the SiOx and the carbon material may be 15:1-7:3. When the weight ratio between the SiOx and the carbon material is below 15:1, the amount of SiOx in the composite is insufficient, such that intercalation with lithium (Li) may not occur smoothly in the final electrochemical reaction. When the weight ratio between the SiOx and the carbon material is above 7:3, the amount of SiOx in the final composite is too large that volumetric expansion by the carbon material may not occur smoothly.

The solid state reaction may be performed through a ball-milling method. It may be conducted through ball-milling the mixture of the SiOx and the carbon material with zirconia balls having a diameter of 1-100 mm to form the SiOx-C composite.

The ball-milling method may be carried out at 50-500 rpm for a duration of 2-15 hours. When the ball-milling is undertaken at a speed below 50 rpm, mixing of the composite may not occur smoothly and the composite may not be properly formed. When the ball-milling speed is faster than 500 rpm, the SiOx may be destroyed due to a high level of energy or be fused through too much pressure applied thereto, leading to a risk of the SiOx being converted into silicon dioxide ($SiO_2$).

When the duration of the ball-milling is less than 2 hours, the composite may not be properly formed, and when the duration of the ball-milling is over 15 hours, further effects on the formation of the composite may be relatively insignificant.

The composite formed above may be heat-treated.

The heat treatment may be performed in an inert gas environment. Inert gases may include argon, nitrogen, hydrogen, and the like.

The heat treatment may be conducted at 800-1000° C. at a temperature increase rate of 1-10° C./minute for 30 minutes to 3 hours, then cooling may be performed at a cooling rate of 1-10° C./minute.

When the temperature of the heat treatment is below 800° C., deoxidization may not occur smoothly and a carbon matrix may not be properly formed. When the temperature of the heat treatment is above 1000° C., diffusion reaction at high temperature may cause the carbide SiOx to form carbon monoxide (CO) through a reaction with oxygen, and a composite may not be properly formed.

Meanwhile, when the temperature increase rate and the cooling rate are below 1° C./minute, productivity may decrease due to an excessively long heat treatment time, and when the temperature increase rate and the cooling rate are above 10° C./minute, the rapid temperature change may cause inadequate deoxidization.

The heat treatment may be carried out for 30 minutes to 3 hours, in order to cause the carbon components of the SiOx-C composite to surround the surfaces of the SiOx powder particles and to suppress oxidization of SiOx.

More preferably, the SiOx-C composite may be heated to 900° C. at a temperature increase rate of 5° C./minute for 1 hour, and be then cooled at a cooling rate of 5° C./minute.

Hereinafter, an anode material for a secondary battery according to exemplary embodiments of the present disclosure will be described in detail.

The anode material for a secondary battery in the embodiment of the present disclosure may be SiOx-C composite particles coated with a carbon material coated on the surface of SiOx.

The SiOx-C composite may have a structure in which the SiOx particles are dispersed on the carbon material, a structure in which SiOx and the carbon material form a core-shell structure, or a structure in which spherical SiOx particles are surrounded by carbon particles.

The average diameter of the SiOx particles may be 10-nm. In case that the SiOx particles are relatively small, reactivity thereof with Si and Li may be increased, and thus, the smallest possible size of SiOx particles is generally desirable. However, the formation of the SiOx-C composite with SiOx particles having an average diameter smaller than 10 nm may be somewhat difficult, causing difficulty in achieving the objective of the present disclosure. Meanwhile, when the average diameter of the SiOx particles is greater than 50 nm, the dispersion of the SiOx particles may not be easy, and thus, the average particle diameter thereof may not exceed 50 nm.

[Mode For Invention]

Hereinafter, exemplary embodiments of the present disclosure will be described in detail. These embodiments are provided so that this disclosure will be thorough and complete, and should not be construed as limiting the scope of the invention.

EXAMPLES

Silicon oxide (SiOx) and pitch-based carbon fibers were prepared at a weight ratio of 10:2, and placed into a wide-mouth bottle having a volume of 50 ml and containing 10 zirconia balls having a diameter of 5 mm. The wide-mouth bottle was placed in a ball mill and a low-energy ball milling was conducted at a speed of 100 rpm for 12 hours to produce a SiOx-carbon (SiOx-C) composite.

The SiOx-C composite was placed in an alumina crucible and a heat treatment was conducted using an electric furnace in an argon gas environment. Temperature was raised to 900° C. at a rate of 5° C./minute, was maintained at 900° C. for 1 hour, and then was decreased to room temperature at a rate of 5° C./minute, to form a final product of an anode material for a secondary battery.

Figure 2:
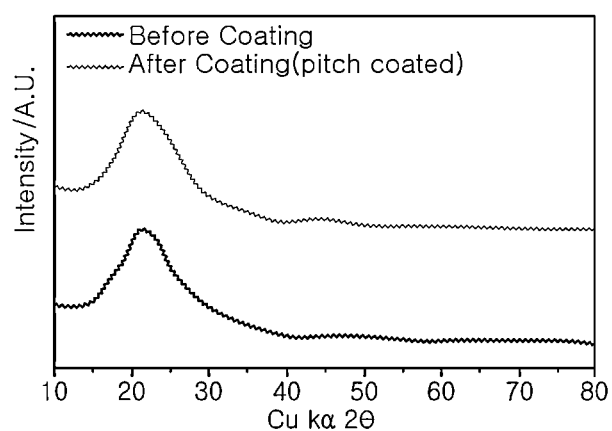
FIG. 2 is a graph illustrating results of x-ray diffraction (XRD) obtained by observing particles before and after coating in an exemplary embodiment of the present disclosure.

The SiOx-C powder formed from the above process is illustrated in FIGS. 1 and 2 as electron microscopic images and as a graph illustrating results of observation of crystal structures using x-ray diffraction (XRD), respectively.

FIG. 1A shows the SiOx before the SiOx-C composite was formed, and FIG. 1B shows the SiOx-C particles according to the exemplary embodiment of the present disclosure. As shown in FIG. 1, the SiOx-C particles in the exemplary embodiment have a nano size of 30 nm-50 nm, as well as being carbon-coated in their matrix structure.

FIG. 2 shows the results of XRD observation of the SiOx powder before and after coating, in order to show crystallization of the powder prepared in the exemplary embodiment of the present disclosure. As shown in FIG. 2, the SiOx maintains the crystal structure of the original silicon monoxide, even after coating, and does not show carbon crystallization, and thus, it can be seen that the SiOx-C composite was formed properly.

Figure 3:
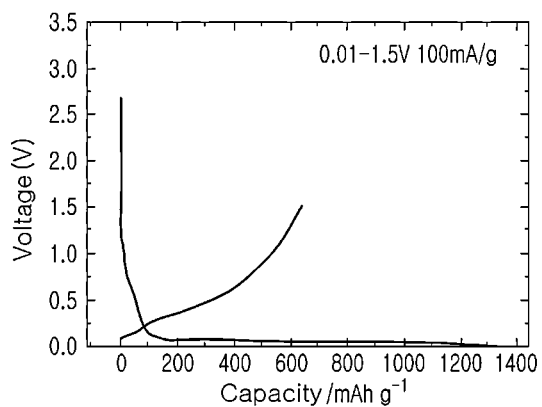
FIG. 3 illustrates experiment results on electrochemical characteristics in an exemplary embodiment of the present disclosure.
Figure 3:
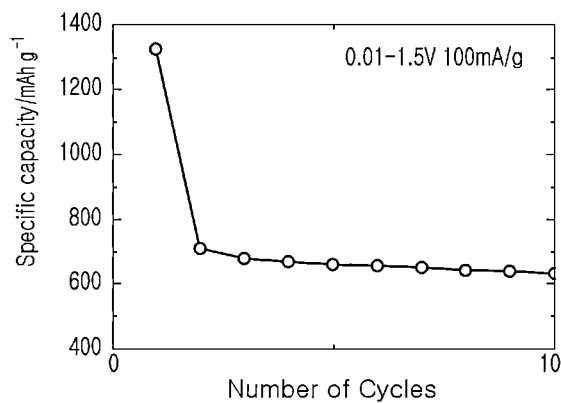

FIG. 3 shows a graph illustrating evaluation results of electrochemical characteristics of the anode material for a secondary battery prepared in the exemplary embodiment of the present disclosure.

The electrochemical characteristics was evaluated with respect to an anode having a size of 1.4875 cm$^2$ formed by applying an anode slurry to one surface of a copper current collector and drying the same at a temperature of approximately 130° C. for 2 hours, wherein the anode slurry was prepared such that the SiOx-C composite was used as an anode active material, ketjenblack was used as a conducting agent, and polyvinylidene fluoride (PVdF) was used as a binder, which were mixed at a weight ratio of 90:2:8, and then mixed with a solvent, N-methyl-2-pyrrolidone (NMP).

Lithium metal foil was used as a cathode. After a polyolefine separator film was interposed between the two electrodes, an electrolyte was injected to form a coin-type half cell, which was used to conduct a charge-discharge test. The results are shown in FIG. 3.

FIGS. 3A and 3B show the results of the charge-discharge test within a range of 0.01-1.5V. Volumetric expansion was suppressed at 1325 mAh/g, a capacity of SiOx in a first cycle, and the capacity was maintained at approximately 630 mAh/g after a second cycle, and thus an efficiency rate of approximately 50% was calculated therefrom. It can be seen that the SiOx shows high capacity which is approximately double that of existing carbon materials.

Meanwhile, FIG. 3C shows results of lifespan characteristics of the half cell within a range of 0.01-1.5V, to secure lifespan. As shown in FIG. 3C, a capacity of 600 mAh/g or more could be secured, even after 10 charge and discharge cycles. In case of Si-based oxides and metal Si, lifespan characteristics could not be identified due to rapid volumetric expansion after 2 charge and discharge cycles. However, in the exemplary embodiments of the present disclosure, carbon suppresses oxidization of the SiOx, thus securing a long lifespan.

As set forth above, according to the exemplary embodiments of the present disclosure, forming the SiOx and the carbon material as the SiOx-C composite allows the carbon in the matrix to suppress reaction between SiOx and oxygen and to suppress reaction of silicon dioxide ($SiO_2$) in SiOx, thus improving reactivity of Si metal with Li. Also, it can be seen that there is provided sufficient space within grain boundaries of the SiOx to secure intercalation of Li, and stable grain boundaries thereof enable intercalation and deintercalation of Li, despite repeated operations.

The invention claimed is:

1. A method of preparing an anode material for a secondary battery, including:
   preparing a silicon oxide and a carbon material;
   forming a silicon oxide-carbon composite by mixing the silicon oxide and the carbon material at a weight ratio of 15:1-7:3 and performing a solid state reaction; and
   performing a heat treatment on the silicon oxide-carbon composite in an inert atmosphere, heated to a temperature of 800-1000° C. at a temperature increase rate of 1-10° C./minute, maintaining the temperature of 800-1000° C. for 30 minutes to 3 hours, and performing cooling at a cooling rate of 1-10° C./minute.

2. The method of preparing an anode material for a secondary battery of claim 1, wherein the silicon oxide is prepared by mixing silicon tetrachloride and ethylene glycol at a weight ratio of 10:90-70:30, stirring for 2-72 hours at a temperature of 50-300° C., and heat-treating a resultant gel at a temperature of 500-1000° C.

3. The method of preparing an anode material for a secondary battery of claim 1, wherein the carbon material is one or more selected from the group consisting of pitch-based carbon fibers, carbon nanotubes, carbon nanofibers, graphene, and graphite.

4. The method of preparing an anode material for a secondary battery of claim 1, wherein the solid state reaction is performed through a ball-milling method using a zirconia ball having a diameter of 1-100 mm.

5. The method of preparing an anode material for a secondary battery of claim 4, wherein the ball-milling method is performed at a rate of 50-500 rpm for 2-15 hours.

6. The method of preparing an anode material for a secondary battery of claim 1, wherein the heat treatment is performed to 900° C. at a temperature increase rate of 5° C./minute, and maintaining the temperature of 900° C. for 1 hour, and the cooling is performed at a cooling rate of 5° C./minute.

\* \* \* \* \*